United States Patent

[11] 3,628,826

[72] Inventor Louis F. Sibley
 RFD #1, Hardwick, Mass. 01082
[21] Appl. No. 865,034
[22] Filed Oct. 9, 1969
[45] Patented Dec. 21, 1971

[54] UNIVERSAL MOUNTING FOR TRUCK COVERS
 1 Claim, 1 Drawing Fig.

[52] U.S. Cl. .................................................. 296/98
[51] Int. Cl. .................................................. B60p 7/04
[50] Field of Search .................................... 296/98,
 100; 160/263, 71; 287/58 R

[56] References Cited
 UNITED STATES PATENTS
 1,580,535 4/1926 Robinson .................... 160/250

| 1,750,285 | 3/1930 | Schuler | 160/71 |
| 2,052,828 | 9/1936 | Hucke | 160/250 |
| 3,498,666 | 3/1970 | Harrawood | 296/100 |
| 3,515,428 | 6/1970 | Killion | 296/100 |

Primary Examiner—Benjamin Hersh
Assistant Examiner—Robert R. Song
Attorney—Charles R. Fay ABSTRACT: A rolled cover for the headboard or cab of a truck wherein the cover can be pulled out as by a bail to the rear of a truck to cover the contents thereof, and a telescoping adjustable mounting for fitting trucks of different widths without the necessity of providing rollers of different lengths for the purpose.

3,628,826
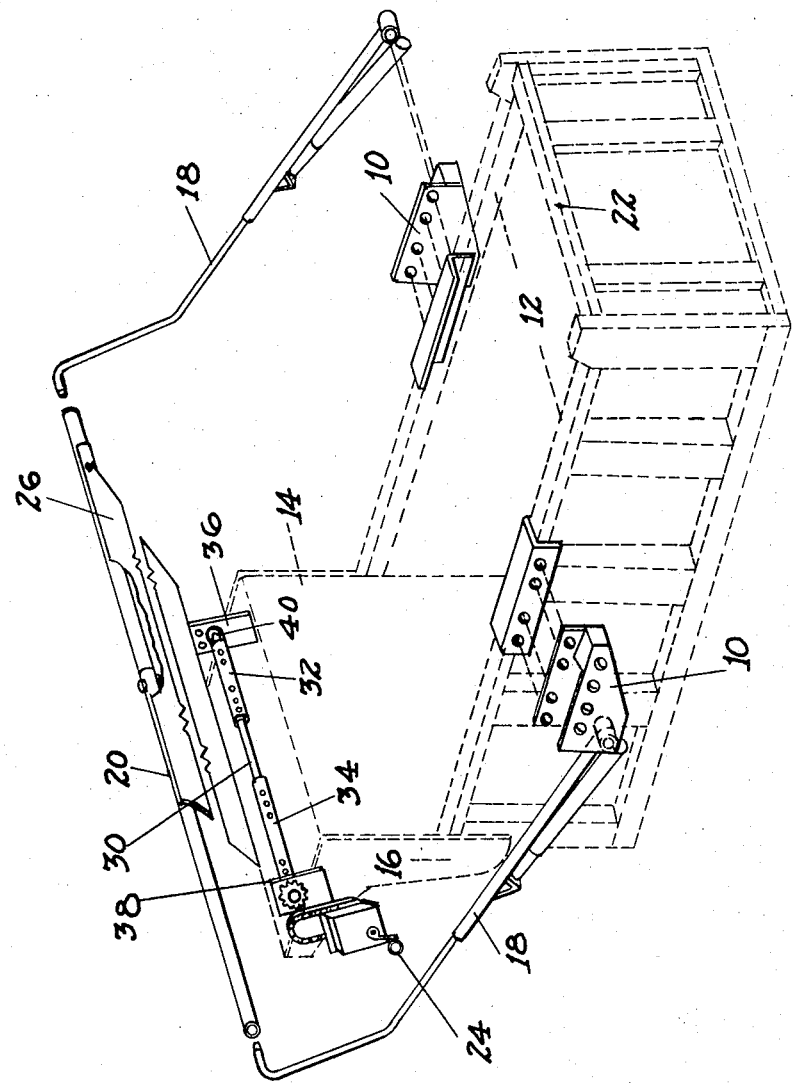
INVENTOR.
Louis F. Sibley
BY
Charles R. Jay, atty.

UNIVERSAL MOUNTING FOR TRUCK COVERS

BACKGROUND OF THE INVENTION

Roll covers for open truck bodies have been suggested in the prior art as for instance U.S. Pat. application Ser. No. 630,011 filed Apr. 11, 1967, and Ser. No. 591,482, filed Jan. 10, 1966, both now abandoned. Whereas these apparatuses operate well and efficiently, nevertheless it has been found that the headboards of trucks vary as to their lengths and that the widths of truck bodies vary to some extent so that roll assemblies of varying lengths have to be made. It is the purpose of the present invention to obviate this difficulty and to provide a roll assembly mounting which is generally universal for the purpose so that only one size of roll need be manufactured which can be mounted on substantially any kind of headboard for open bodied trucks.

SUMMARY OF THE INVENTION

A large bail is mounted on the sidewalls of the open truck body, said bail having secured thereto the leading end of a roll of canvas or the like which is adapted to be drawn out from the headboard of a truck by the bail and past the tailgate to completely cover the contents of the truck. A roller assembly is mounted on the headboard or cab, this roller assembly comprising an elongated rod, its ends being mounted on the sides or the ends of the headboard or cab. Means are provided for winding the roller to withdraw the cover and the bail assembly from its covering position to an uncovered position, the bail being for instance spring or pneumatically assisted and covering the truck, so that it is very easy to operate the same between covered and uncovered positions.

In the present case the roller is made in three parts having a telescoping center rod received in a pair of axially aligned tubular members each of which is on an end bearing plate which can be mounted varying distances apart, depending upon the width of the headboard. The tubular members are provided for the reception of pins so that the length of the roller mounting is fixed once it has been installed. The cover however need not be varied inasmuch as it can be made originally wide enough to cover any ordinary truck, and it is only the roller assembly which has to be made adjustable to fit the headboard.

BRIEF DESCRIPTION OF THE DRAWING

The figure is a perspective view illustrating the invention and showing the bail starting to unroll the cover from the adjustable roll assembly therefor.

PREFERRED EMBODIMENT OF THE INVENTION

The structure in this case is based upon the patent applications referred to above. In essence plates 10, 10 are mounted on the sidewalls 12, 12 of the body of an open top truck which has a headboard as at 14. The headboard is provided with sides 16 and the legs 18 of a large bail are allowed to pivot on the the plates 10 between a position wherein the end of the bail 20 substantially overlies the headboard or cab of the truck when the cover is in rolled up inoperative position; or alternatively the bail is rotated toward the observer in FIG. 1 to bring the cover back over the tailgate 22 to completely cover the contents of the truck. A crank arrangement may be provided as at 24 for rolling the cover up into inoperative position and holddowns may be used at the sides for holding the cover to the truck if desired.

The cover itself is indicated at 26 and this may be canvas or some other durable material having a forward or free end secured with respect to the member 20 of the bail as clearly shown. The other end of the cover is secured to a roll which forms the subject matter of the present invention, this roll being clearly shown as comprising a central rod 30 telescoping into a pair of axially aligned tubular members 32 and 34, the latter being mounted in any way desired to extend inwardly from the respective bearing plates 36 and 38, which bearing plates are mounted on the end portions 16 of the cab of the truck or in some other like manner with respect to the headboard 14.

Both the ends of the member 30 and the tubular members 32 and 34 are provided with spaced holes for the longitudinal adjustment of the roll assembly itself comprising the three members 30, 32 and 34. When these parts are adjusted to the correct length, then cotter pins or the like may be inserted through these holes in order to hold the parts in adjusted position. Also holes may be provided as at 38 for adjustably mounting the opposite ends of the tubular members 32 and 34, from the rod 30, on studs or the like 40 in turn mounted on the respective bearing plates 36, 36.

I claim:

1. In combination with an open top vehicle body and a headboard, a rolled up cover assembly mounted on the headboard, said roll assembly comprising a pair of bearing plates on the headboard in spaced relation, a tubular member on each plate, said tubular member being open end and extending toward each other in aligned relation with a gap therebetween, a rod having an end in each of said tubular members, and means to secure the rod to the tubular members in axially adjusted condition dependent on the width of the headboard, and a flexible vehicle body cover rolled up on said tubular members and rod, a bail assembly having the legs thereof mounted on the vehicle body and the closed end of the bail being longer than the roll assembly and secured with respect to a free end of said flexible body cover, the other end of which is to be rolled on said tubular members and rod to enable the body cover to be rolled up to its inoperative position, means to actuate said bail in a direction to unroll the cover, and means to rotate the tubular members, the body cover having a width in excess of the length of the combined tubular members and rod so that a single width of cover is used with all adjustments thereof.

* * * * *